United States Patent [19]
Sung et al.

[11] Patent Number: 5,719,375
[45] Date of Patent: Feb. 17, 1998

[54] STIFFENER MANUFACTURING METHOD AND APPARATUS THEREOF

[75] Inventors: Kun Peo Sung, Choongmu; Ki Soo Kim, Kyungsangnam-do; Seong Gi Park, Kyungsangnam-do; Hogu Kim, Kyungsangnam-do, all of Rep. of Korea; Tadashi Nakajima, Tokyo, Japan; Masamichi Kawakami, Tokyo, Japan; Mitsunobu Hanyu, Tokyo, Japan; Yoshihiro Suzuki, Tokyo, Japan

[73] Assignee: Samsung Heavy Industries Co., Ltd., Seoul, Rep. of Korea

[21] Appl. No.: 371,169

[22] Filed: Jan. 11, 1995

[30] Foreign Application Priority Data

Jan. 12, 1994 [KR] Rep. of Korea .............. 94-378

[51] Int. Cl.$^6$ .............. B23K 26/00; B23K 7/00
[52] U.S. Cl. .............. 219/121.72; 219/121.39; 219/121.67; 266/59
[58] Field of Search .............. 219/121.67, 121.72, 219/121.39, 121.44; 83/43, 44, 45, 46, 48; 266/48, 49, 50, 59

[56] References Cited

U.S. PATENT DOCUMENTS

| 2,406,155 | 8/1946 | Messenger | 83/43 |
| 3,620,521 | 11/1971 | Lundberg | 266/59 |
| 3,866,892 | 2/1975 | Hooper | 266/59 |
| 4,297,151 | 10/1981 | Hoffken et al. | 266/50 |
| 4,495,000 | 1/1985 | Möller | 266/50 |

FOREIGN PATENT DOCUMENTS

| 71304 | 2/1983 | European Pat. Off. | 266/59 |
| 58-224090 | 12/1983 | Japan | 219/121.72 |
| 59-199188 | 11/1984 | Japan | 219/121.72 |
| 94/13424 | 6/1994 | WIPO | 219/121.44 |

Primary Examiner—Geoffrey S. Evans
Attorney, Agent, or Firm—Dilworth & Barrese

[57] ABSTRACT

A Stiffener manufacturing method and apparatus appropriate for manufacturing a stiffener such as a flat bar is disclosed. The stiffener manufacturing method is composed of a steel plate arrangement step, a strip-cutting step and a pattern cutting step, which are performed in a predetermined interval of time at a position. The stiffener manufacturing apparatus is composed of a matrix working table on which the steel plate is put, a guide rail which is installed in either side of the matrix working table, a stripping carriage which passes over the upper portion of the steel plate installed on the matrix working table, and in which a plurality of stripping torches for cutting the steel plate into a plurality of strips are installed in a predetermined distance spaced from each other, the stripping carriage being capable of linearly travelling along the guide rails, and a patterning carriage which passes over the upper portions of the strips installed on the matrix working table, and in which a patterning torch for cutting the strips into a predetermined pattern is installed, the patterning carriage being movably installed along the guide rail in a predetermined distance spaced from the stripping carriage. Using the stiffener manufacturing method and the apparatus thereof, an exact dimensioned stiffener can be efficiently mass-produced.

15 Claims, 4 Drawing Sheets

STIFFENER MANUFACTURING METHOD AND APPARATUS THEREOF

BACKGROUND OF THE INVENTION

The present invention relates to a technology of manufacturing a steel plate, and particularly to a method and an apparatus for manufacturing a stiffener such as a flat bar.

Generally, various structures such as a ship and a steel structure are formed from a number of structure members which are welded to each other. Such structure members are made from a strength member for providing strength to an entire structure against bending or breaking, and a reinforcement member for reinforcing the strength member. As to the reinforcement members among such structure members, there are various kinds such as: a bracket for increasing The strength of a bent portion and preventing a turn-over of the strength member; a stiffener for preventing local variation, buckling or twist; a diaphragm; and a strut.

FIG. 1 is a cross-sectional view of a state in which a flat bar being a kind of a stiffener is attached to a structure of a ship. An angle-shaped stiffener is mainly used for reinforcing a main strength member such as a girder "G" which is installed in a deck "D" of a ship shown in FIG. 1, while a flat bar-shaped stiffener is widely used for light reinforcement purposes such as for preventing buckling. As shown in FIG. 1, flat bar "B" has two parallel sides and two stress-dispersing inclined sides. As the case may be, the flat bar is formed in such a manner that a welding line of an adjacent member passes through, and a scallop is formed for dispersing the stresses. Such a flat bar-shaped stiffener such as "B" in FIG. 1 is made of a cut steel plate.

A conventional manufacturing process of a flat bar-shaped stiffener will be described with reference to FIGS. 2 and 3. FIG. 2 is a plan view of a general stripping cutter. FIG. 3 is a plan view of a strip for explaining a pattern manufacturing process of the strip which is cut in the FIG. 2 apparatus.

As shown in FIG. 2, a guide rail 40 is installed in either side of a matrix working table 30. A carriage 50 for travelling along guide rail 40 is installed on guide rail 40. Cutting torches 51 are disposed in a predetermined distance spaced from each other on carriage 50. In such a stripping cutter, after a steel plate "P" is loaded on matrix working table 30, the respective cutting torches 51 are operated and then carriage 50 is travelled along guide rail 40, to thereby cut steel plate P into respective strips S having a predetermined width.

Strips "S" cut through the above processes are moved to another working position after completion of cooling strips "S", and are arranged as shown in FIG. 3. Then, a cutting line "L" is marked on strips "S" and strips are cut along marked cutting line "L" in a manual cutting method, to obtain a desired pattern of a flat bar "B". Here, the work for cutting strips "S" into a predetermined pattern may be automated using a robot.

Generally, many thousands of stiffeners such as flat bars "B" are used for building a ship. Thus, when many of the stiffeners such as flat bars B are made by a manual cutting method, very complicated and confusing processes are required. For example, strips S cut in the FIG. 2 stripping cutter should be moved to the next working position, the moved strips S should be arranged in a desired shape, a cutting line is marked on the arranged strips "S", member numbers for easy selection after cutting are labelled on the arranged strips "S", and the labelled members are cut with the manual torches. Also, for doing the above processes, a particular working place is needed, a process control is not so simple, and additional manpower is consumed for moving strips "S".

On the other hand, when a robot is used for cutting strips "S" into a pattern, there is also a basic problem. That is, when steel plate "P" is in the process of cutting strips "S", respective strips "S" are stressed outwardly by thermal variation. At this time, since strips "S" are constrained for long period by a portion which has not been cut yet, until the steel plate is completed, strips "S" are twisted. Although such twisted strips S are automatically nested and cut, it is difficult to obtain an exactly dimensioned flat bar "B".

SUMMARY OF THE INVENTION

Therefore, to solve the above problems, it is an object of the present invention to provide a stiffener manufacturing method capable of mass manufacturing of stiffeners each of which has an exact dimension.

Another object of the present invention is to provide a stiffener manufacturing apparatus embodying a stiffener manufacturing method according to the present invention.

To accomplish the above object of the present invention, there is provided a stiffener manufacturing method for obtaining stiffeners of predetermined shapes by cutting a steel plate, the stiffener manufacturing method comprising the steps of:

arranging the steel slate in a predetermined position; cutting the steel plate into a plurality of strips; and cutting the respective strips into a predetermined shape while cutting the steel plate into the plurality of the strips, starting from the strip which has been cut in the strip-cutting step.

There is also provided a stiffener manufacturing apparatus for obtaining stiffeners of predetermined shapes by cutting a steel plate, the stiffener manufacturing apparatus comprising:

a matrix working table on which the steel plate is put; a guide rail which is installed in either side of the matrix working table; a stripping carriage which passes over the upper portion of the steel plate installed on the matrix working table, and in which a plurality of stripping torches for cutting the steel plate into a plurality of strips are installed in a predetermined distance spaced from each other, the stripping carriage being capable of linearly travelling along the guide rails; and a patterning carriage which passes over the upper portions of the strips installed on the matrix working table, and in which a patterning torch for cutting the strips into a predetermined pattern is installed, the patterning carriage being movably installed along the guide rail in a predetermined distance spaced from the stripping carriage.

DETAILED DESCRIPTION OF THE PREFERRED EMBODIMENT

A preferred embodiment of the present invention will be described below in more detail with reference to the accompanying drawings.

Figure 1:
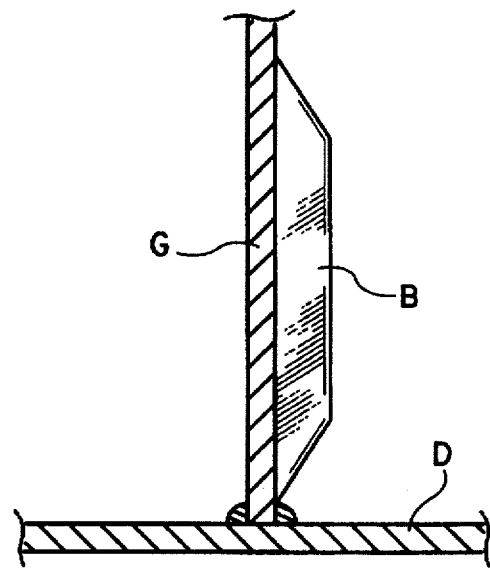
FIG. 1 is a cross-sectional view of a state in which a flat bar is attached to a structure of a ship.
Figure 2:
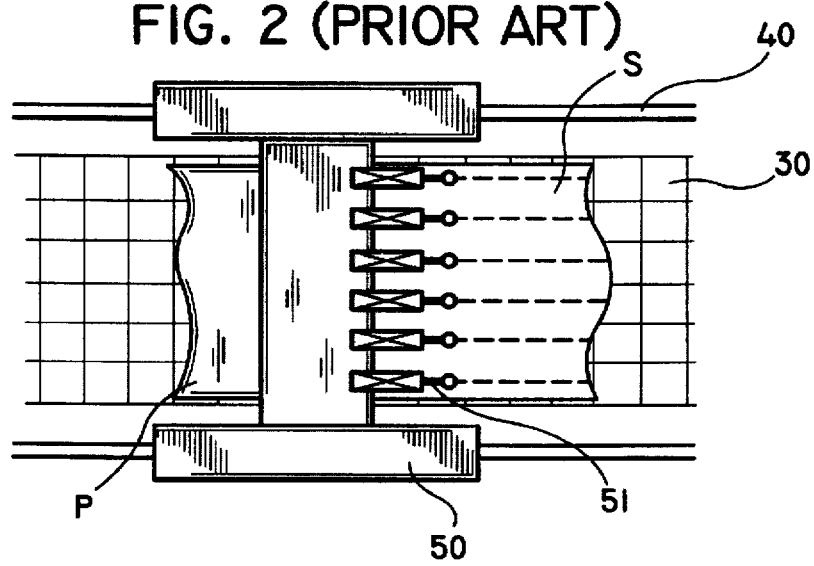
FIG. 2 is a plan view of a general stripping cutter.
Figure 3:
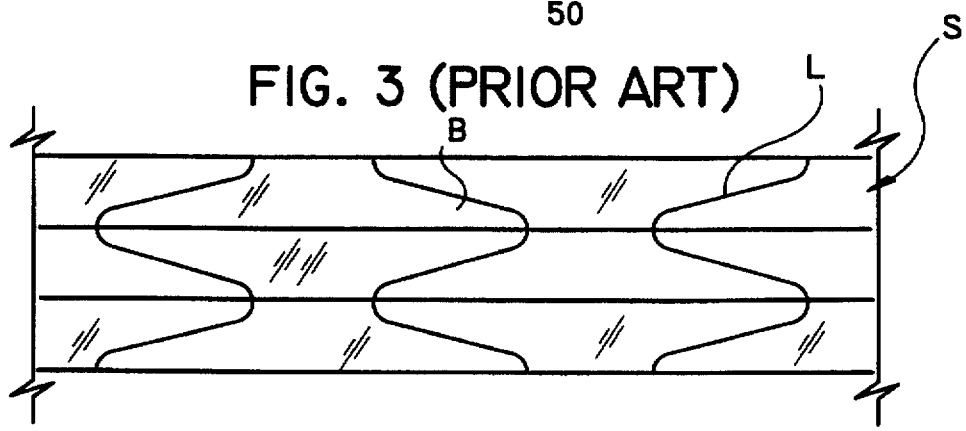
FIG. 3 is a plan view of the strips for explaining a pattern cutting process of the strips cut in the FIG. 2 apparatus.
Figure 4:
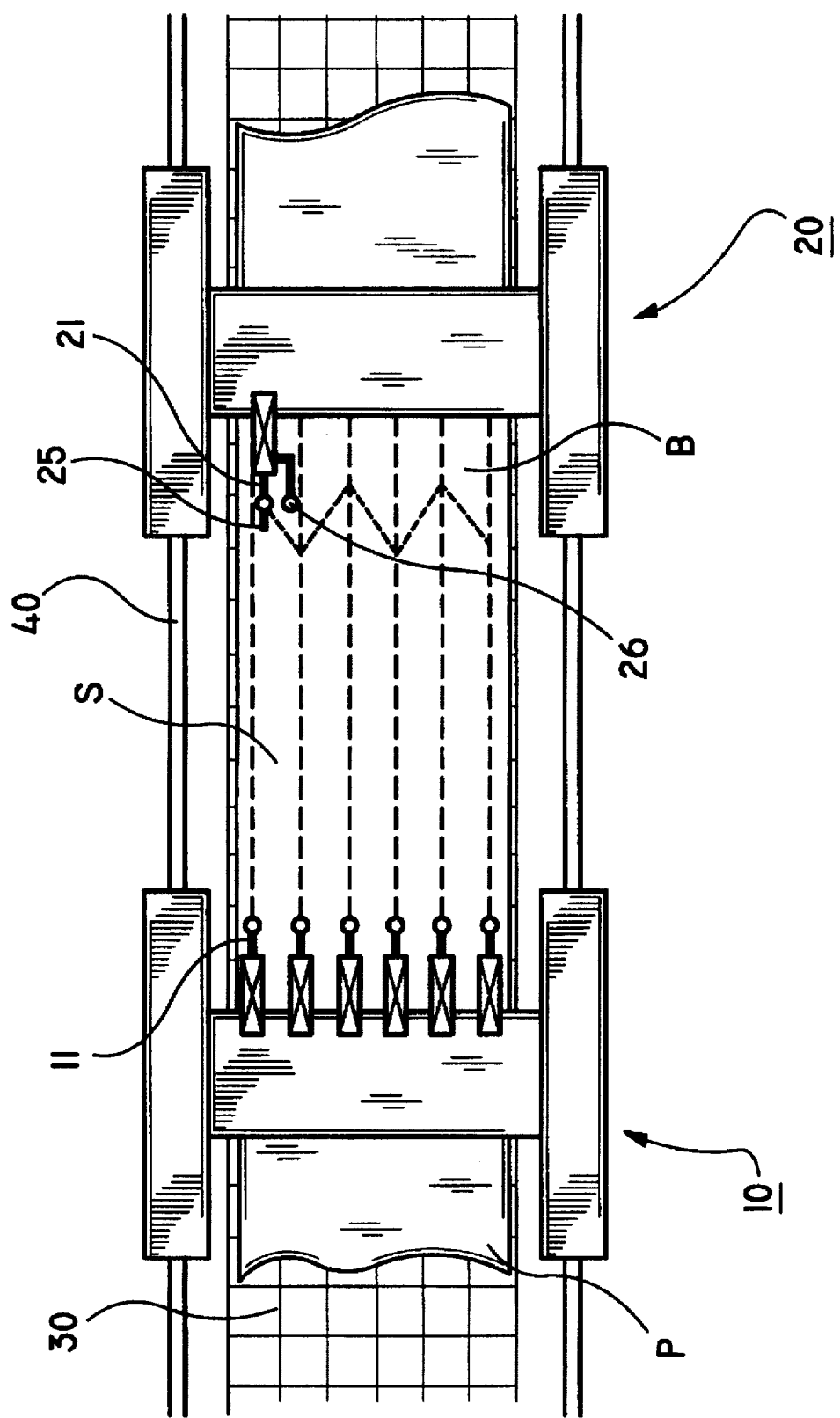
FIG. 4 is a plan view of a stiffener manufacturing apparatus according to the present invention.

FIG. 4 shows a plan view for explaining a stiffener manufacturing apparatus according to the present invention, the stiffener manufacturing apparatus includes a matrix working table 30 on which a steel plate P is loaded. A guide rail 40 is installed on either side of matrix working table 30. A stripping carriage 10 and a patterning carriage 20 travel along guide rails 40 40.

A plurality of stripping torches 11 of which the mutual distance can be adjusted are installed in stripping carriage 10. Stripping torches 11 are for cutting a steel plate into strips S. Patterning carriage 20 following stripping carriage 10 includes at least one patterning torch 21 for cutting strips S into predetermined patterns.

Here, stripping torch 11 for performing a linear cutting may be an oxygen cutting torch or a gas cutting torch. However, since patterning torch 21 should preform an inclined line cutting or a curved line cutting, a plasma cutting torch or a laser cutting torch having an excellent characteristic in a curved line cutting may be used.

In the stiffener manufacturing apparatus according to the present invention as described above, patterning carriage 20 moves in a predetermined distance from stripping carriage 10, for example, with an interval of 1 through 3 meters therebetween. The distance can be adjusted according to a thickness of steel plate P or a width of strip S. Here, two carriages 10 and 20 can be fixed in a predetermined distance from each other. Also, one carriage can include two torches 11 and 21 for performing the stripping and patterning, simultaneously. However, since the cutting characteristics of two torches 11 and 21 differ from each other, it is desirable that a distance between two carriages 10 and 20 should be adjusted. Accordingly, it is desirable that two carriages 10 and 20 are separately constructed.

It is desirable that such a stiffener manufacturing apparatus is controlled by a computer including hardware circuitry and software programs such as a CAD/CAM program, in which at least an input and an output, an arithmetic operation and a storage of data are possible and a pattern process is possible.

Figure 5:
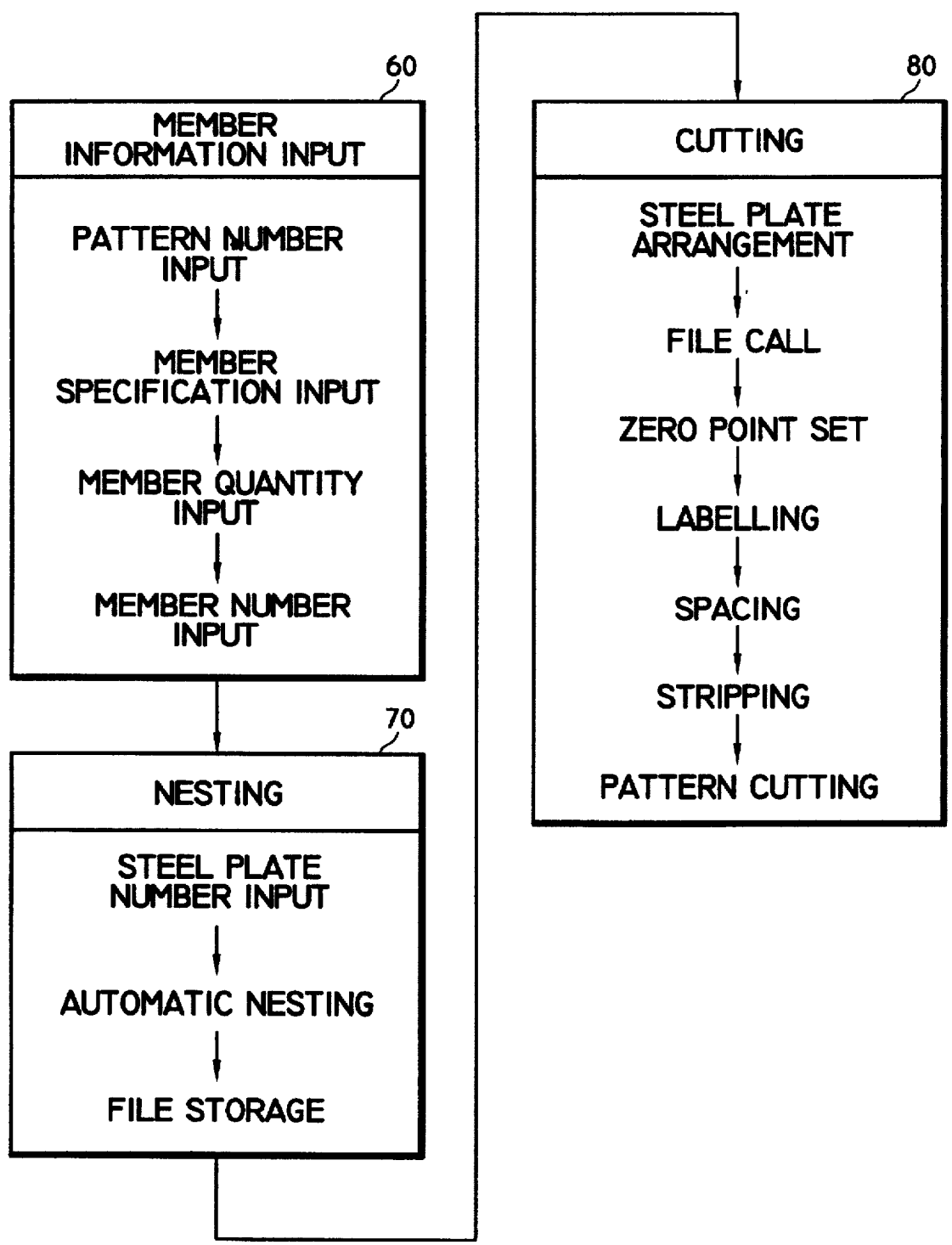
FIG. 5 is a flowchart for explaining a control process of the FIG. 4 apparatus.

FIG. 5 is a flowchart showing a control process of the FIG. 4 apparatus. The control process includes three steps, a member information input step 60, a nesting step 70 and a cutting step 80.

In member information input step 60, a member specification and quantity are first input by addressing a corresponding pattern number, that is, a macro number to designate respective member numbers.

In nesting step 70, if an administration number is input, corresponding information such as a length, a width and a thickness is designated. Accordingly, a software of a CAM program performs an automatic nesting of the respective members according to the respective member patterns input during the member information input step 60. In such a nesting step 70, an optimal nesting is accomplished according to priority set by the software. When the nesting is completed, the nested pattern information is stored in a file with respect to the administration number of the corresponding steel plate.

In cutting step 80, steel plate P is first disposed on matrix working table 30, an administration number of steel plate P is input and a corresponding file is called. Then, it is desirable that an external end of the steel plate P is detected by a sensor installed in patterning torch 21, to identify a zero point of the steel plate. Accordingly, a zero point of a control computer is set to match that of steel plate P. After setting the zero point, a member number is labelled on a corresponding position of steel plate P, if necessary. It is desirable that a labelling torch 26 for performing the labelling is additionally installed in patterning torch 21 capable of tracing in any patterns. After completing the labelling, a distance between respective stripping torches 11 in stripping carriage 10 is automatically adjusted according to the information called from a file. It is desirable that a predetermined displacement means such as a servo motor for automatic spacing of stripping torches 11 is installed in stripping torches 11. After passing through the above process, stripping carriage 10 starts to travel. Steel plate P starts to be cut into a plurality of strips S by igniting stripping torches 11.

On the other hand, patterning carriage 20 follows stripping carriage 10 spaced in a predetermined distance during the strip-cutting by stripping torches 11, while cutting strips S into a predetermined pattern by patterning torch 21.

During cutting steel plate P as described above, respective torches 11 and 21 pierce at a starting point and an end point of the cutting portion of the steel Mate P. In this case, The starting point and the end point of stripping torch 11 for cutting steel plate P into strips S exist only in either side of steel plate P, which does not cause any problem. However, a cutting line of patterning torch 21 becomes discontinuous due to a gap between the adjacent strips S. Accordingly, if the starting point and the end point of the stripping torch 11 is not properly selected, adjacent strips S may be damaged.

Figure 6A:
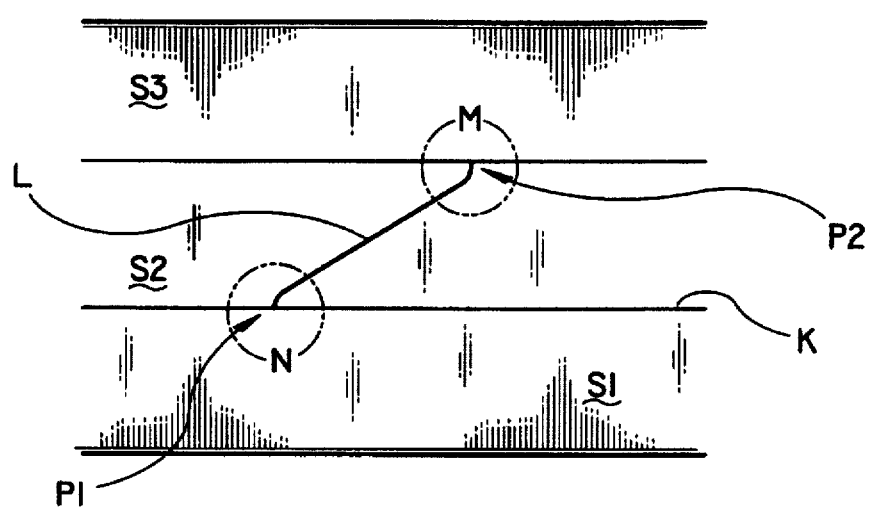
FIGS. 6A, 6B and 6C are views for explaining a pattern cutting process according to the present invention.
Figure 6B:
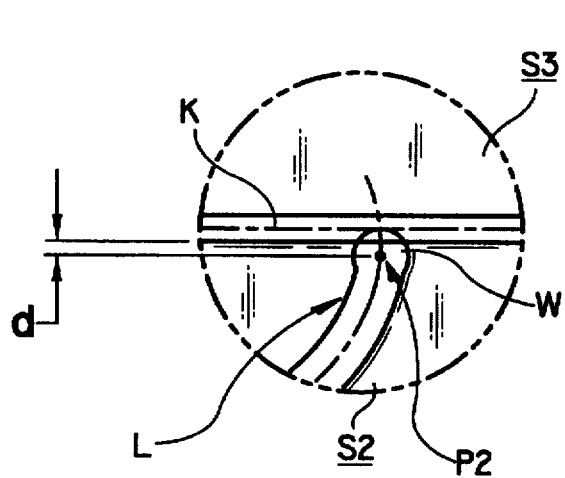
Figure 6C:
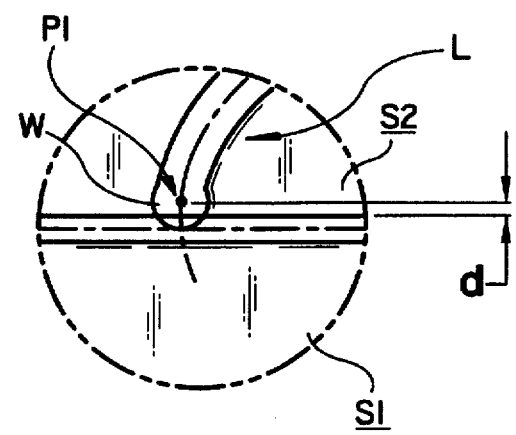

To prevent such a problem, the starting point and the end point of the cutting work of the patterning torch should be properly selected, which will be described with reference to FIGS. 6A through 6C. FIG. 6A is a plan view of the strips. FIG. 6B is an enlarged view of a portion M in FIG. 6A. FIG. 6C is an enlarged view of a portion N in FIG. 6A. Referring to FIGS. 6A through 6C, the patterning torch performs a predetermined patterned cutting with respect to a middle strip S2 among three strips S1, S2 and S3 disposed in turn.

The patterning torch pierces steel plate P at starting point of cutting line P1, and performs cutting along cutting line L and completes cutting at end point P2. A melting portion W having a circle of a predetermined radius from the center thereof is formed in either starting point P1 or end point P2. It is desirable that the external end exists in a cutting kerf K by the stripping torch to avoid melting portion W from overreaching adjacent strips S1 and S2. For doing so, starting point P1 and end point P2 of the pattern cutting of the patterning torch is located inwardly by a predetermined distance d from the external end of cutting kerf K of the stripping torch. By doing so, adjacent strips S1 and S3 can be prevented from being damaged due to the pattern cutting in one strip S2.

As described above with reference to FIGS. 4 through 6C, the stiffener manufacturing method and apparatus can continuously work a steel plate into the stiffeners at a single working position. Accordingly, the present invention requires a smaller working area than that of the conventional technology and can increase more than several times productivity. Also, since the strips are cut at a nearly invariable state, respective stiffeners having an exact dimension can be obtained.

What is claimed is:

1. A stiffener manufacturing method for obtaining stiffeners of predetermined shapes by cutting a steel plate, said stiffener manufacturing method comprising the steps of:

arranging the steel plate in a predetermined position;

cutting the steel plate into a plurality of strips with a first cutting torch; and cutting the respective strips into a predetermined shape with a second cutting torch;

wherein at least a portion of the step of cutting the steel plate into a plurality of strips occurs during the step of cutting the respective strips into a predetermined shape.

2. A stiffener manufacturing method according to claim 1, further comprising the step of storing information with respect to said steel plate, a width of the strip and the stiffener to be worked.

3. A stiffener manufacturing method according to claim 1, further including the step of locating a cutting start point and end point for the step of cutting the steel plate into a plurality of strips inwardly from the external ends of the strips.

4. A stiffener manufacturing apparatus for obtaining stiffeners of predetermined shapes by cutting a steel plate, said stiffener manufacturing apparatus comprising:

a matrix working table on which the steel plate is supported;

a guide rail installed on each side of the matrix working table;

a stripping carriage positioned over the upper portion of the steel plate installed on the matrix working table, the stripping carriage being capable of linearly travelling along the guide rails and having a plurality of stripping torches for cutting the steel plate into a plurality of strips, the stripping torches being installed a predetermined distance from each other; and a patterning carriage movable independently of the stripping carriage along the guide rails, the patterning carriage being movable over the upper portions of the strips installed on the matrix working table and including a patterning torch for cutting the strips into a predetermined pattern, the patterning torch being positioned to cut the strips into the predetermined pattern while the stripping torches are cutting the steel plates into the plurality of strips.

5. A stiffener manufacturing apparatus according to claim 4, wherein said patterning torch is a plasma cutting torch or a laser cutting torch.

6. A stiffener manufacturing apparatus according to claim 4, wherein a cutting start point and end point with respect to the respective strips of said patterning torch are located inward from the external ends of the respective strips.

7. A stiffener manufacturing apparatus according to claim 4, wherein said stripping torch is an oxygen cutting torch or a gas cutting torch.

8. A stiffener manufacturing apparatus for obtaining stiffeners of predetermined shapes by cutting a steel plate; said stiffener manufacturing apparatus comprising:

a matrix working table on which the steel plate is put:

a guide rail which is installed in either side of the matrix working table;

a stripping carriage which passes over the upper portion of the steel plate installed on the matrix working table, and in which a plurality of stripping torches for cutting the steel plate into a plurality of strips are installed in a predetermined distance spaced from each other, said stripping carriage being capable of linearly travelling along the guide rails;

a patterning carriage which passes over the upper portions of the strips installed on the matrix working table, and in which a patterning torch for cutting the strips into a predetermined pattern is installed, said patterning carriage being movably installed along the rail in a predetermined distance spaced from the stripping carriage; and wherein a sensor for detecting the external end of said steel plate is installed in said patterning torch.

9. A stiffener manufacturing apparatus according to claim 7, wherein said stripping torch is an oxygen cutting torch or a gas cutting torch.

10. A stiffener manufacturing apparatus according to claim 7, wherein said patterning torch is a plasma cutting torch or a laser cutting torch.

11. A stiffener manufacturing apparatus according to claim 7, wherein a cutting start point and end point with respect to the respective strips of said patterning torch are located inward from the external ends of the respective strips.

12. A stiffener manufacturing apparatus for obtaining stiffeners of predetermined shapes by cutting a steel plate, said stiffener manufacturing apparatus comprising:

a matrix working table on which the steel plate is put;

a guide rail which is installed in either side of the matrix working table;

a stripping carriage which passes over the upper portion of the steel plate installed on the matrix working table, and in which a plurality of stripping torches for cutting the steel plate into a plurality of strips are installed in a predetermined distance spaced from each other, said stripping carriage being capable of linearly travelling along the guide rails;

a patterning carriage which passes over the upper portions of the strips installed on the matrix working table, and in which a patterning torch for cutting the strips into a predetermine pattern is installed, said patterning carriage being movably installed along the guide rail in a predetermined distance spaced from the stripping carriage;

wherein a labelling torch for labelling member numbers on predetermined positions in the steel plate to be cut is installed in said patterning torch.

13. A stiffener manufacturing apparatus according to claim 8, wherein said stripping torch is an oxygen cutting torch or a gas cutting torch.

14. A stiffener manufacturing apparatus according to claim 8, wherein said patterning torch is a plasma cutting torch or a laser cutting torch.

15. A stiffener manufacturing apparatus according to claim 8, wherein a cutting start point and end point with respect to the respective strips of said patterning torch are located inward from the external ends of the respective strips.

* * * * *